(12) United States Patent
Helsley

(10) Patent No.: US 12,054,965 B2
(45) Date of Patent: Aug. 6, 2024

(54) CLEVIS-SENSING ADJUSTABLE HOOK LATCH

(71) Applicant: HARTWELL CORPORATION, Placentia, CA (US)

(72) Inventor: Thomas John Helsley, Placentia, CA (US)

(73) Assignee: Hartwell Corporation, Placentia, CA (US)

( * ) Notice: Subject to any disclaimer, the term of this patent is extended or adjusted under 35 U.S.C. 154(b) by 393 days.

(21) Appl. No.: 17/422,413

(22) PCT Filed: Jan. 28, 2020

(86) PCT No.: PCT/US2020/015313
§ 371 (c)(1),
(2) Date: Jul. 12, 2021

(87) PCT Pub. No.: WO2020/159920
PCT Pub. Date: Aug. 6, 2020

(65) Prior Publication Data
US 2022/0120115 A1 Apr. 21, 2022

Related U.S. Application Data

(60) Provisional application No. 62/797,456, filed on Jan. 28, 2019.

(51) Int. Cl.
| | |
|---|---|
| *E05B 13/10* | (2006.01) |
| *B64D 29/06* | (2006.01) |
| *E05B 17/00* | (2006.01) |
| *E05B 63/06* | (2006.01) |
| *E05C 19/14* | (2006.01) |

(52) U.S. Cl.
CPC .............. *E05B 13/10* (2013.01); *B64D 29/06* (2013.01); *E05B 17/00* (2013.01); *E05B 63/06* (2013.01); *E05C 19/145* (2013.01); *E05B 2017/0095* (2013.01)

(58) Field of Classification Search
CPC ...... E05B 13/00; E05B 13/103; E05B 13/101; E05B 13/105; E05B 13/106; E05B 17/00; E05B 2017/00; E05B 2017/0095; E05B 63/00; E05B 63/06; E05C 19/00; E05C 19/145; B64D 29/00; B64D 29/06
USPC ........................................................... 70/207
See application file for complete search history.

(56) References Cited

U.S. PATENT DOCUMENTS

| | | | | |
|---|---|---|---|---|
| 2,904,141 | A |  | 9/1959 | Henrichs |
| 3,194,595 | A | * | 7/1965 | Wheeler ............... E05C 19/145 292/113 |
| 3,259,412 | A | * | 7/1966 | Wheeler ............... E05C 19/145 292/DIG. 31 |
| 4,116,479 | A | * | 9/1978 | Poe ....................... E05C 19/145 292/DIG. 60 |
| 4,318,557 | A |  | 3/1982 | Bourne et al. |

(Continued)

OTHER PUBLICATIONS

Search Report & Written Opinion issued in Int'l Appl. No. PCT/US2020/015313 (2020).

*Primary Examiner* — Nathan Cumar
(74) *Attorney, Agent, or Firm* — Barnes & Thornburg LLP

(57) ABSTRACT

A latch mechanism includes a hook, a displaceable handle, and links connected between the handle and hook for the operation of the latch mechanism. The handle and links cooperate with the hook to hold the latch mechanism in a locked position.

17 Claims, 6 Drawing Sheets

(56) References Cited

U.S. PATENT DOCUMENTS

| | | | |
|---|---|---|---|
| 4,602,812 A * | 7/1986 | Bourne | E05C 19/145 |
| | | | 292/DIG. 60 |
| 5,620,212 A | 4/1997 | Bourne et al. | |
| 6,279,971 B1 * | 8/2001 | Dessenberger, Jr. | ... E05B 41/00 |
| | | | 292/DIG. 31 |
| 6,325,428 B1 | 12/2001 | Do | |
| 6,343,815 B1 * | 2/2002 | Poe | E05C 19/145 |
| | | | 292/DIG. 31 |
| 7,131,672 B2 * | 11/2006 | Pratt | B64D 29/06 |
| | | | 292/201 |
| 8,864,189 B2 | 10/2014 | Fournie et al. | |
| 2008/0129056 A1 | 6/2008 | Hernandez et al. | |
| 2011/0133489 A1 | 6/2011 | Hemeury et al. | |
| 2015/0259957 A1 | 9/2015 | Hernandez | |

* cited by examiner

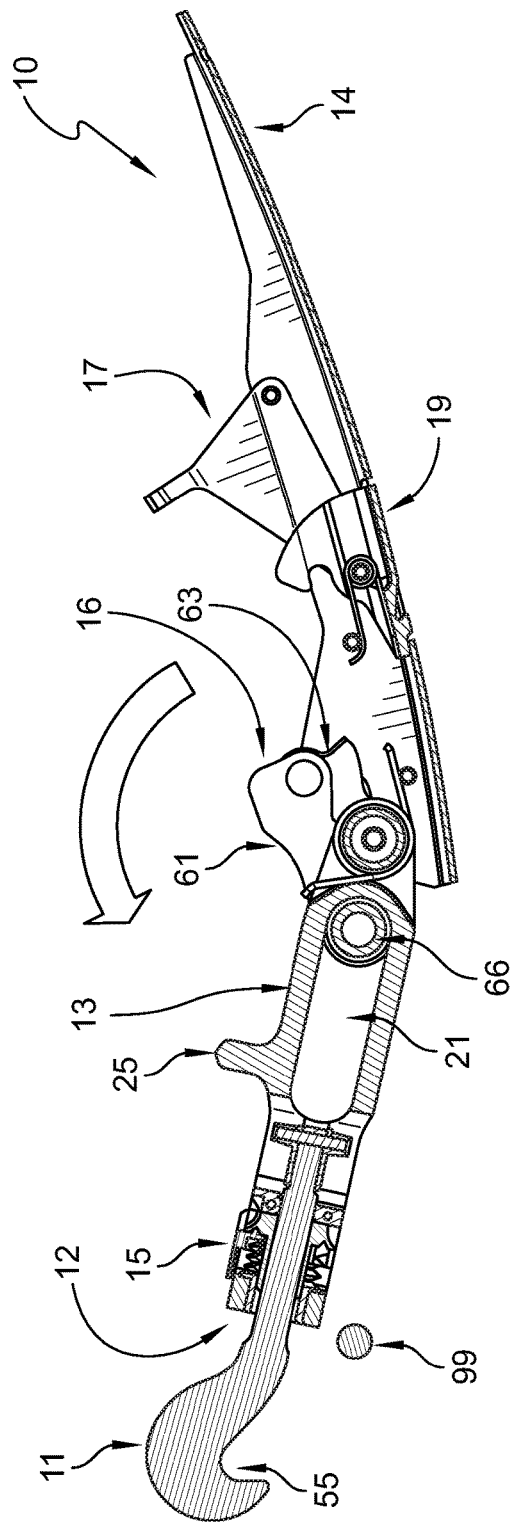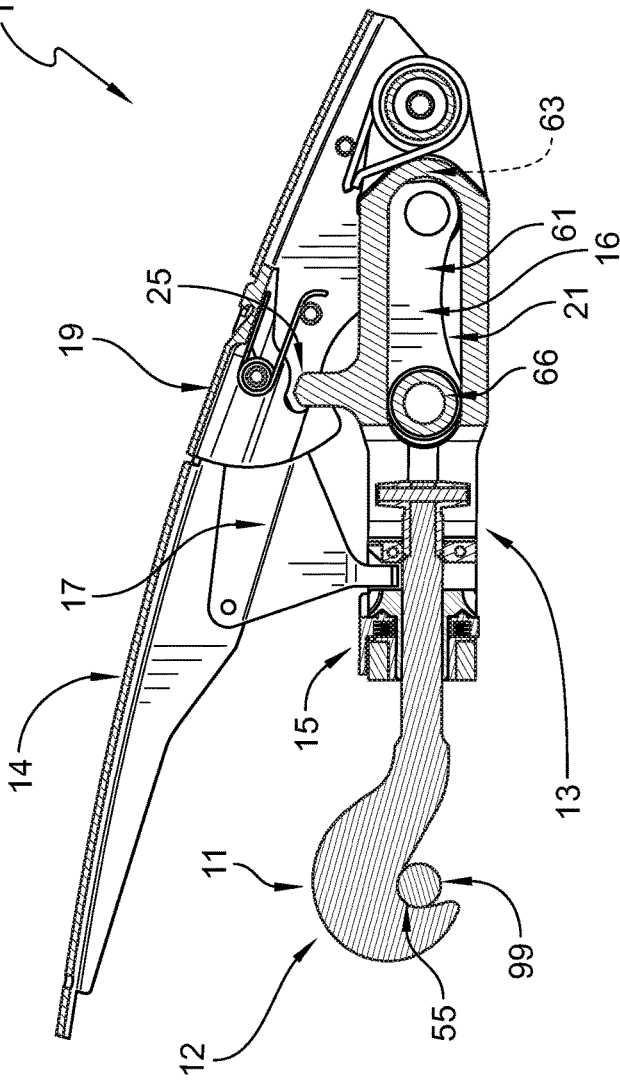

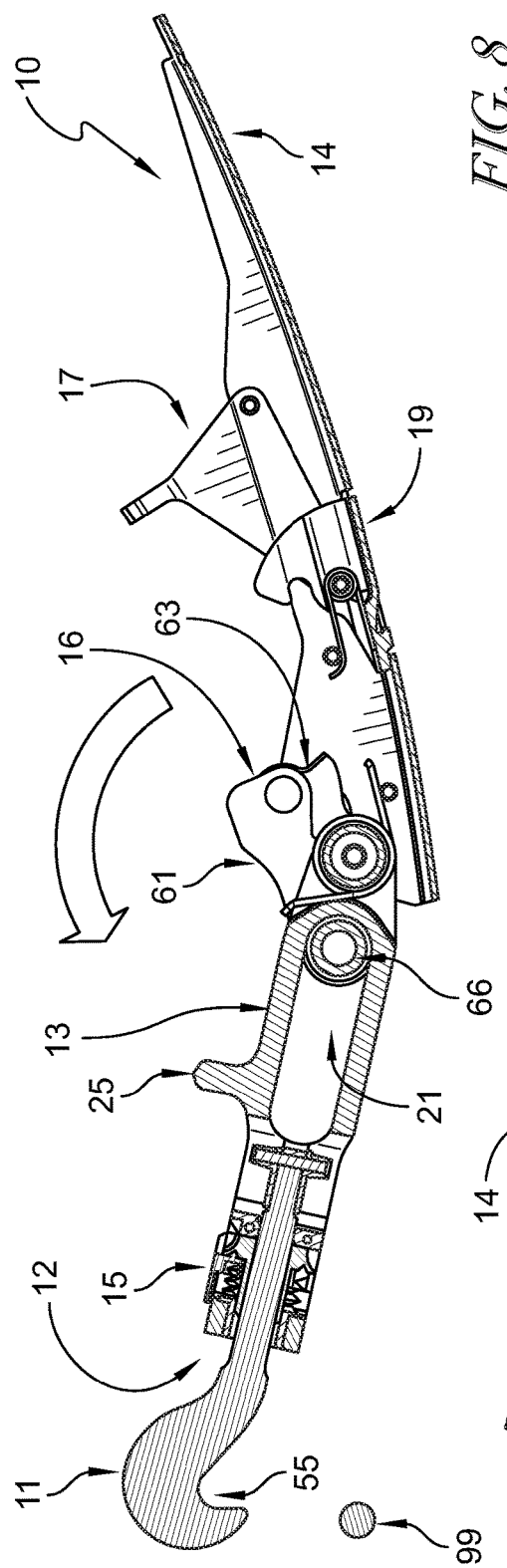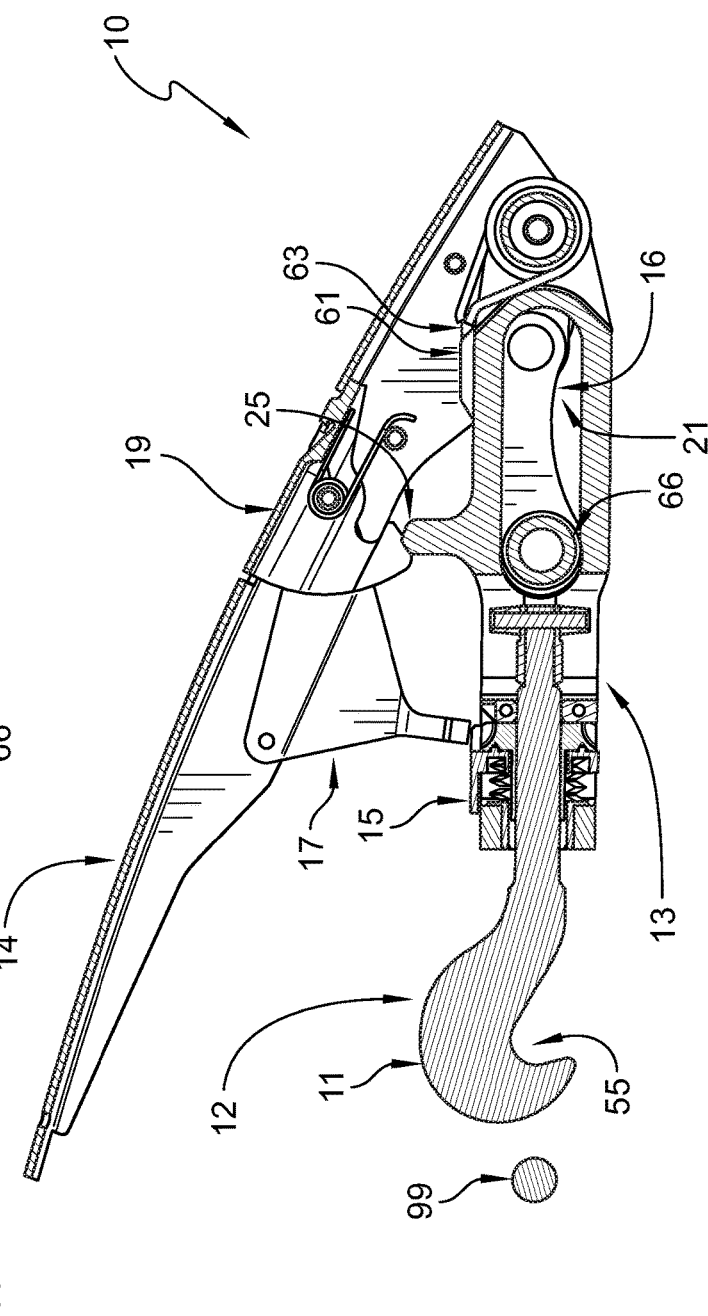

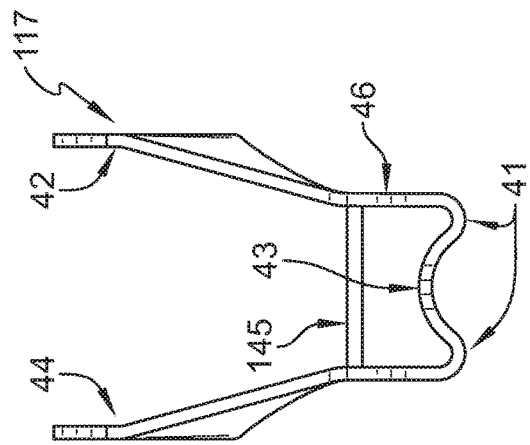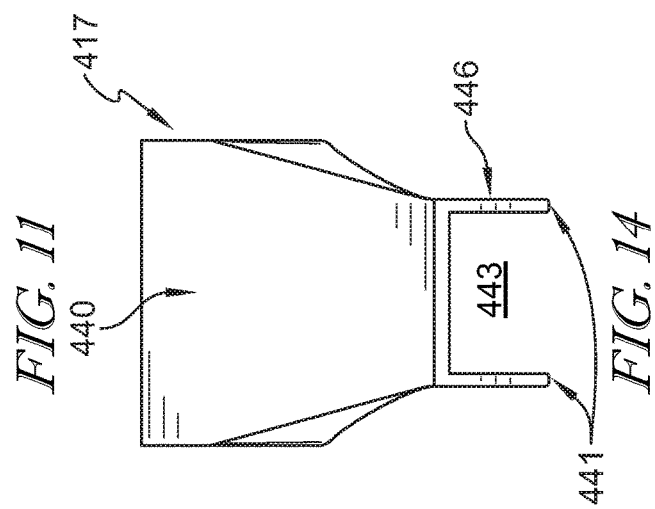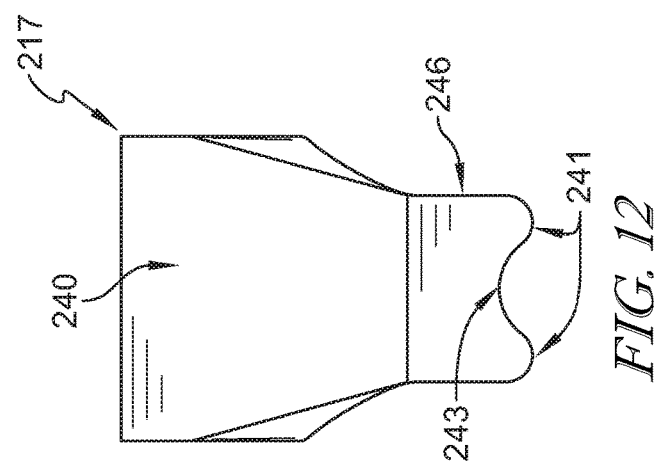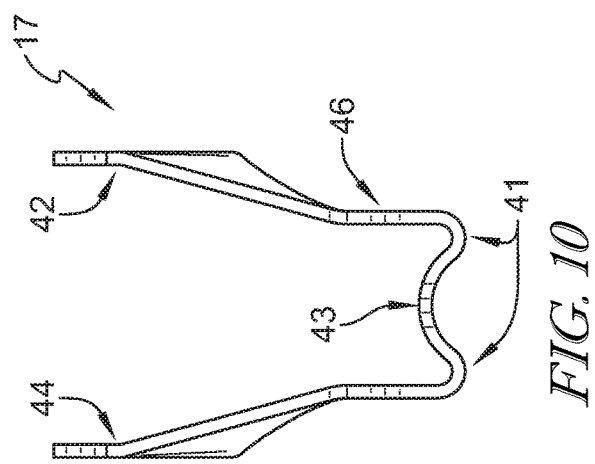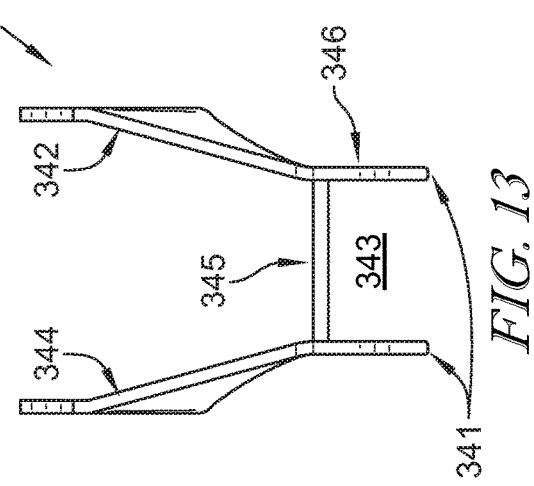

CLEVIS-SENSING ADJUSTABLE HOOK LATCH

CROSS REFERENCE TO RELATED U.S. PATENT APPLICATION

This present application is a U.S. nationalization under 35 U.S.C. § 371 of International Application No. PCT/US2020/015313, filed Jan. 28, 2020, which claims priority under 35 U.S.C. § 119(e) to U.S. Provisional Patent Application Ser. No. 62/797,456, filed on Jan. 28, 2019. The disclosures set forth in the referenced applications are incorporated herein by reference in their entireties.

FIELD OF THE DISCLOSURE

The present disclosure relates generally to a latch, and specifically to a rotary latch mechanism for use on aircraft. More specifically, the present disclosure relates to a rotary latch mechanism for releasably securing a first structure relative to a second structure.

BACKGROUND

A variety of latches are used on aircraft to retain various components of the aircraft in a locked condition under circumstances such as flight and storage of the aircraft. During maintenance or repair periods the latches must operate to unlock the corresponding panel, cowling, or other device. For example, the latch on a cowling can be disengaged to allow the cowling to be opened away from the engine components which it houses. The cowling, once opened, allows the aircraft maintenance professional to access the engine components. At the end of the repair event the cowling is closed. The latch is used to lock the cowling in the closed condition to retain the engine components in the housing.

As an additional matter, the maintenance professional may use a device to "clip" the latches closed to keep them from projecting out from the aircraft body or housing. The latches are clipped in a closed or lower profile position to prevent the latches from becoming bumped or from bumping the maintenance professional. Clipping the latches does not necessarily close or lock the latch but allows the latch to be maintained in a much lower profile against the aircraft housing or body. However, clipped latches can inadvertently appear to be locked and as such may fail to be locked. Additionally, even if the latches are operated to attempt to lock them a potential issue with the latch mechanism might interfere with complete locking and as such could inadvertently unlatch during operation. It would be desirable to develop a system and assembly to be used with a latch to help provide assurances that the latch will, in fact, be closed and locked in the proper position.

This background information is merely for context and no admission is intended, nor should such admission be inferred or construed, that any of the preceding information constitutes prior art against the present disclosure.

SUMMARY

According to embodiments of the present disclosure, a clevis-sensing mechanism for use with a latching system provides structures which function to prevent full closure of the latch in an unsecured position and allow closure of the latch when the latch is properly engaged with a clevis of a mating component.

According to embodiments of the present disclosure, a latch mechanism includes a hook, a handle, a linkage, and a clevis-sensing mechanism. The hook includes a hook body and a hook end coupled to the hook body. The handle is coupled to the hook body for rotation relative to the hook body between a closed position where the handle extends along the hook and an opened position where the handle is spaced apart from the hook end. The linkage is coupled between the handle and the hook, and configured to move the hook relative to a clevis with rotation of the handle. The clevis sensing-mechanism is configured to block the handle from moving to the closed position in response to the hook end being spaced apart from the clevis and to allow the handle to move to the closed position in response to the hook end being engaged with the clevis.

In illustrative embodiments, the clevis sensing mechanism includes a detent coupled to the hook and a balking structure coupled to the handle for movement with the handle. The detent is movable between a blocking position to engage with the balking structure and block rotation of the handle to the closed position and an access position to define a void for at least a portion of the balking structure to enter the void and allow the handle to move to the closed position.

In illustrative embodiments, the linkage is arranged for mounting the latch mechanism on a first structure and the clevis is mounted on a second structure. The latch mechanism engages with the clevis to retain the first structure against the second structure with the handle in the closed position.

BRIEF DESCRIPTION OF THE DRAWINGS

The present disclosure will be described hereafter with reference to the attached drawings which are given as a non-limiting example only, in which:

FIG. 6 is a view similar to FIG. 4 showing the handle in a fully opened position and the latch mechanism arranged for engagement with the clevis and suggesting that the handle rotates toward a closed position relative to the hook to move the latch mechanism to the locked position;

FIG. 7 is a view similar to FIG. 6 showing the handle moved to the closed position and the hook engaged with the clevis and suggesting that the hook end and detent move relative to the hook body with movement of the latch mechanism toward the locked position when the hook is engaged with the clevis;

FIG. 8 is a view similar to FIG. 6 showing the handle in the fully opened position and the latch mechanism misaligned with the clevis and suggesting that the handle rotates toward a free position relative to the hook to move the latch mechanism toward the locked position;

FIG. 9 is a view similar to FIG. 8 showing the handle moved to the free position and the hook spaced apart from the clevis and suggesting that engagement of the balking structure with the detent blocks movement of the handle from the free position to the closed position and movement of the latch mechanism to the locked position when the hook is spaced apart from the clevis; and FIGS. 10-14 are front elevation views of various embodiments of balking structures in accordance with the present disclosure.

The exemplification set out herein illustrates embodiments of the disclosure that are not to be construed as limiting the scope of the disclosure in any manner Additional features of the present disclosure will become apparent to those skilled in the art upon consideration of the following detailed description of illustrative embodiments exemplifying modes of carrying out the disclosure as presently perceived.

DETAILED DESCRIPTION

Figures 1, 2:
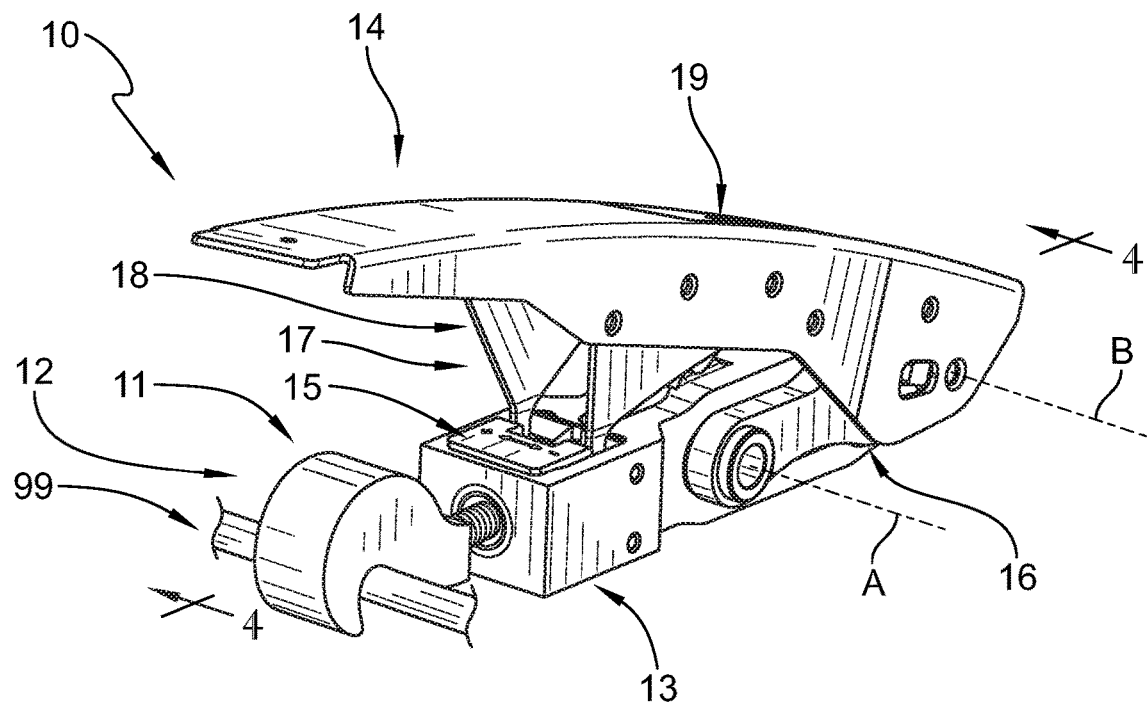
FIG. 1 is a perspective view of one embodiment of a latch mechanism in accordance with the present disclosure showing that the latch mechanism includes a hook, a displaceable handle, and links connected between the handle and hook and suggesting that engagement of the hook with a clevis of a mating component allows the latch mechanism to move to a locked position.
FIG. 2 is a view similar to FIG. 1 showing the latch mechanism in an unlocked position and suggesting that a clevis-sensing mechanism blocks movement of the latch mechanism toward the locked position, shown in FIG. 1, with rotation of the handle toward the hook when the hook is spaced apart from the clevis.

An illustrative latch mechanism 10 in accordance with the present disclosure is shown in FIGS. 1 and 2. Latch mechanism 10 includes a hook 12, a handle 14, and a connecting linkage 16 coupled to hook 12 and handle 14. Handle 14 and linkage 16 operate to move hook 12 relative to an axis A for engagement and disengagement with a keeper or clevis 99. A clevis-sensing mechanism 18 in accordance with the present disclosure is configured to block movement of latch mechanism 10 from an unlocked position, shown in FIG. 2, to a locked position, shown in FIG. 1, when hook 12 is spaced apart or disengaged from clevis 99 as suggested in FIG. 2. Handle 14 is also blocked from moving from a free position, shown in FIG. 2, to a closed position, shown in FIG. 1, by clevis-sensing mechanism 18 when hook 12 is spaced apart from clevis 99. A visual signal is provided to a user, such as a technician or inspector, that latch mechanism 10 is not in the locked position when handle 14 is in the free position.

A mounting bolt or other fastener extends along axis A to hold latch mechanism 10 on a first component, such as a first panel or door of an aircraft. Clevis 99 is coupled to an adjacent second component, such as a second panel or doorway of an aircraft. Latch mechanism 10 is configured to hold the first and second components together in the locked position as suggested in FIG. 1, such as during flight, and allow movement of the first and second components relative to one another at the selection of a user in an unlocked position as suggested in FIG. 2, such as during maintenance. A trigger 19 engages with hook 12 when latch mechanism 10 is in the locked position to block movement of handle 14 relative to hook 12 and movement of latch mechanism 10 toward the unlocked position at the selection of a user.

Linkage 16 is also placed in an over-center configuration when latch mechanism 10 is in the locked position. A sufficient force on handle 14 is required to overcome a biasing force through linkage 16 to move handle 14 relative to hook 12 and move latch mechanism 10 from the locked position to the unlocked position to disengage latch mechanism 10 from clevis 99.

Hook 12 includes an adjustable hook end 11 and a hook body 13 as shown in FIGS. 1 and 2. In the illustrative embodiment, clevis-sensing mechanism 18 includes a detent 15 and a balking structure 17. Detent 15 is coupled to hook end 11 for movement therewith relative to hook body 13 between an access position, shown in FIG. 1, and a blocking position, shown in FIG. 2. Balking structure 17 is coupled to handle 14 for movement therewith relative to hook 12.

Handle 14 is configured to rotate relative to hook 12 about an axis B as suggested in FIGS. 1 and 2. Detent 15 is biased toward the blocking position and balking structure 17 engages with detent 15 to block rotation of handle 14 from the free position toward the closed position when hook 12 is spaced apart from clevis 99 as suggested in FIG. 2. This allows handle 14 to protrude outward from the first component that latch mechanism 10 is attached with to provide a signal to a user that latch mechanism 10 is not in the locked position.

Figure 3:
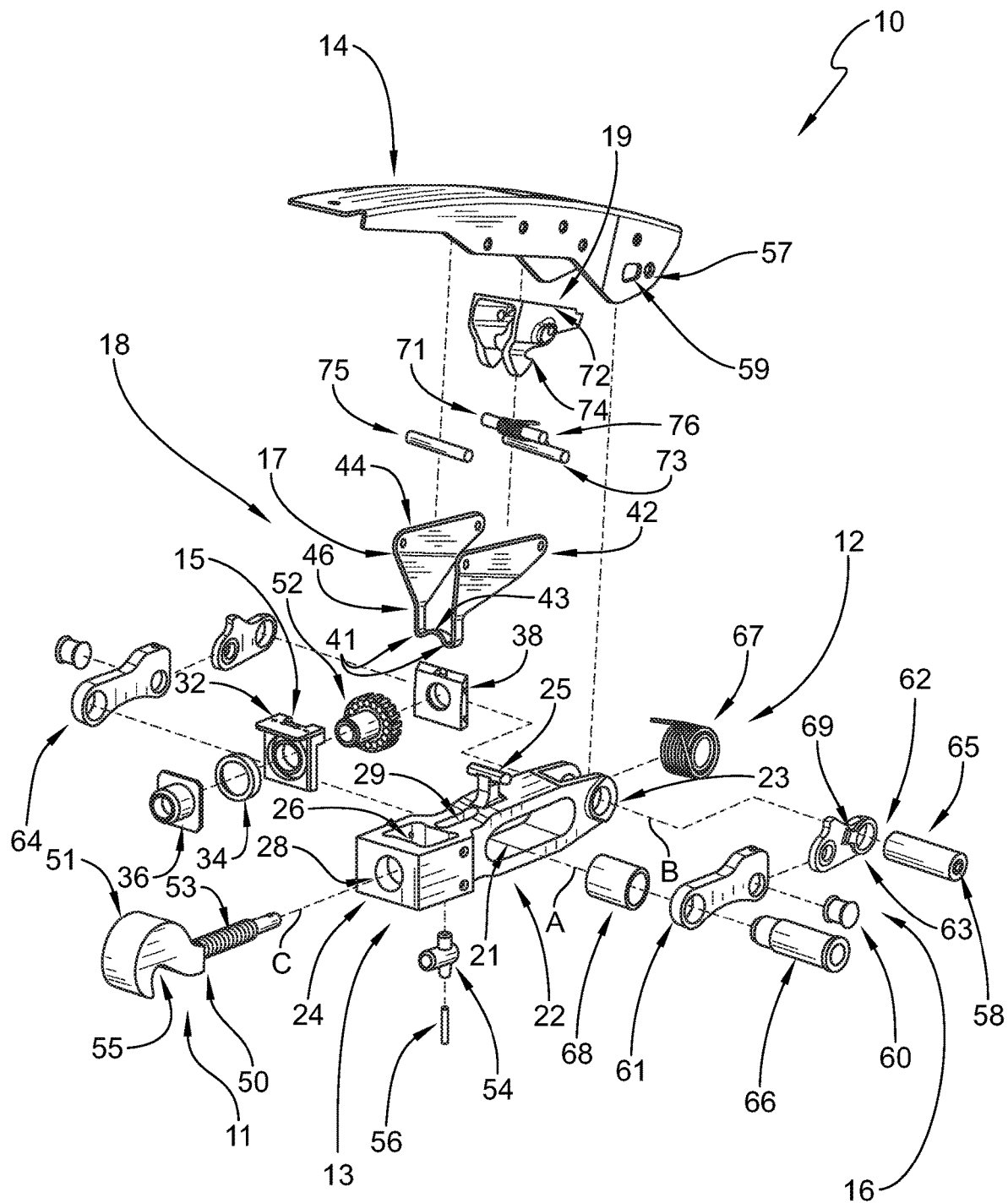
FIG. 3 is an exploded perspective assembly view of the latch mechanism of FIG. 1.

Hook body 13 includes a frame 22 and a hook-end receiver 24 coupled to frame 22 as shown in FIG. 3. Frame 22 is formed to define an elongated slot 21 extending through frame 22 and aligned with axis A and a bore 23 extending through frame 22 and aligned with axis B. Hook-end receiver 24 is formed to define a pocket 26 extending vertically (in the orientation of FIG. 3) through hook-end receiver 24 and a bore 28 extending through hook-end receiver 24 and aligned with an axis C. A slot 29 is formed vertically (in the orientation of FIG. 3) through hook body 13. A retainer 25 extends from frame 22 for engagement with trigger 19 to hold latch mechanism 10 in the locked position at the selection of a user.

Detent 15 includes a detent plate 32 and a biasing member 34, such as a spring, as shown in FIG. 3. In the illustrative embodiment, spring 34 is positioned between detent plate 32 and a wear plate 36. Detent plate 32, spring 34, and wear plate 36 are received in pocket 26 of hook body 13 and aligned with bore 28 along axis C. Spring 34, such as a coil or wave spring, engages with detent plate 32 and wear plate 36 to bias detent plate 32 toward the blocking position of detent 15. In some embodiments, no wear plate 36 is used and spring 34 engages with detent plate 32 and an inner surface of pocket 26. A lock plate 38 is received in pocket 26 and coupled to hook-end receiver 24, such as with a fastener (e.g., rivet), to block removal of detent 15 from pocket 26.

Balking structure 17 includes a pair of spaced apart connector walls 42, 44 and a contact portion 46 coupled to connector walls 42, 44 as shown in FIG. 3. Connector walls 42, 44 are coupled to handle 14 to hold balking structure 17 on handle 14. Contact portion 46 is formed to define fingers 41 and a bridge 43 extending between fingers 41. Fingers 41 are arranged for engagement with detent plate 32 when detent 15 is in the blocking position.

Adjustable hook end 11 includes a head 50 and an adjuster 52 as shown in FIG. 3. Head 50 includes a grip 51 and a shaft 53 extending from grip 51. Grip 51 is formed to define an engagement area 55 for engagement with clevis 99. In the illustrative embodiment, shaft 53 is threaded and adjuster 52 engages with shaft 53 to move head 50 relative to hook body 13 when adjuster 52 is rotated. Adjuster 52 is received in a pocket 26 and shaft 53 extends along axis C into bore 28 to engage with adjuster 52. In some embodiments, hook end 11 is not adjustable and is coupled to detent plate 32 at a fixed position on shaft 53 for movement relative to hook body 13. In some embodiments, a position of clevis 99 is adjustable. A limiter 54 extends into slot 29 of hook body 13 to engage with shaft 53. A fastener 56, such as a rivet, extends into limiter 54 and shaft 53 top hold limiter 54 on adjustable hook end 11. Limiter 54 moves in slot 29 as head 50 is adjusted and is configured to limit travel of head 50 relative to hook body 13. Limiter 54 also engages with slot 29 to block excessive rotation of head 50 relative to hook body 13. When assembled, lock plate 38 also blocks removal of adjuster 52 from pocket 26 in addition to detent 15. Bridge 43 of balking structure 17 is shaped and arranged to provide clearance around shaft 53 for contact portion 46 to enter pocket 26 when detent 15 is in the access position as suggested in FIGS. 4 and 5.

Linkage 16 includes two link pairs 62, 64 and a bushing 66 as shown in FIG. 3. Link pairs 62, 64 are positioned along opposing sides of hook 12 and each include a first link 61 and a second link 63. Bushing 66 extends through first links 61 and slot 21 along axis A for rotation of first links 61 around axis A and for movement of bushing 66 along slot 21. In some embodiments, a spacer 68 is positioned over bushing 66 between first links 61. Second links 63 are coupled to first links 61 by fasteners 60, such as rivets, and first and second links 61, 63 are arranged for rotation relative to one another around fasteners 60. A spindle 65 extends through second links 63 and hook 12 along axis B for rotation of second links 63 relative to hook 12. A fastener 58, such as a rivet, extends along axis B into holes 57 in handle 14 and through spindle 65 to couple handle 14 with hook 12 for rotation about axis B. Slots 59 formed through handle 14 are configured to engage with projections 69 on second links 63 to rotate second links 63 with rotation of handle 14. Rotation of handle 14 causes rotation of second link 63 about axis B and pulls first link 61 and bushing 66 (including axis A) toward axis B, thereby moving bushing 66 along slot 21. A pop-up spring 67 is engaged between handle 14 and hook 12 to assist in movement of handle 14 relative to hook 12.

Trigger 19 includes a button pad 72 and a catch 74 as shown in FIG. 3. Catch 74 engages with retainer 25 coupled to hook body 13 to block rotation of handle 14 relative to hook 12 and hold latch mechanism 10 in the locked position at the selection of a user. A user engages pad 72 to rotate trigger 19 relative to handle 14 such that catch 74 moves away from retainer 25 to disengage catch 74 from retainer 25 and allow rotation of handle 14 relative to hook 12. A spring 76 is mounted on sleeves 71, 73 and engages with pad 72 to bias catch 74 toward retainer 25. Sleeves 71, 73 are coupled to handle 14 to hold trigger 19 and spring 76 on handle 14. Sleeves 71, 75 are also coupled to handle 14 to hold balking structure 17 on handle 14.

Figure 4:
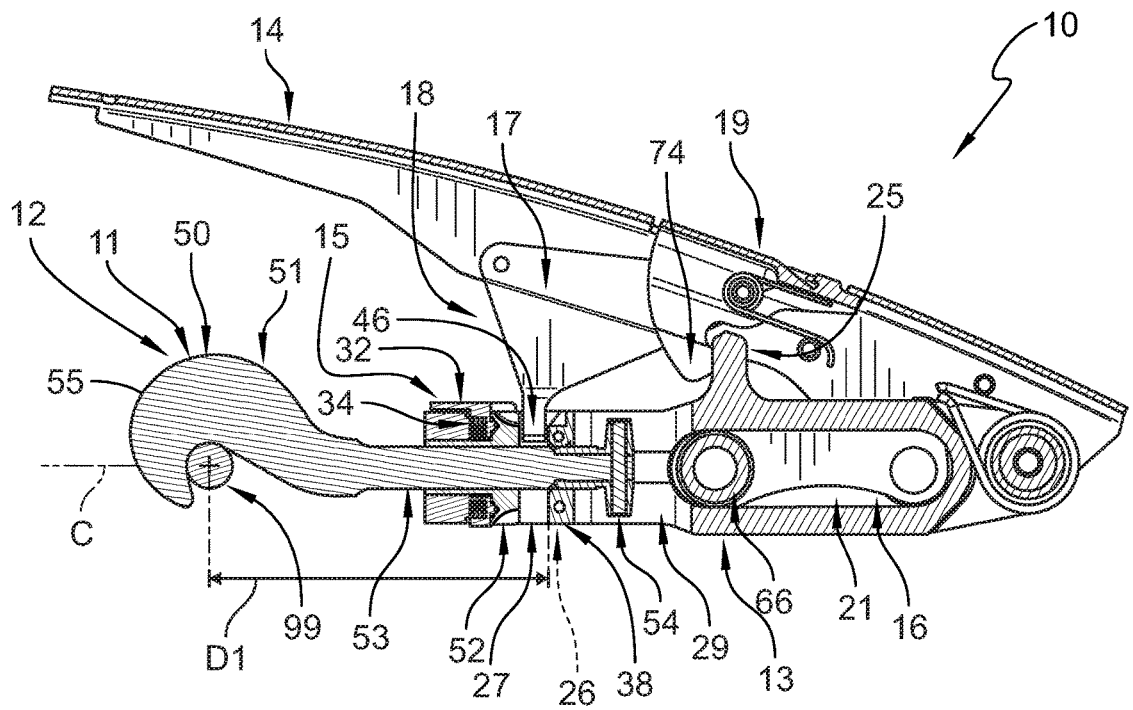
FIG. 4 is a sectional view taken along line 4-4 in FIG. 1 showing that a detent of the clevis-sensing mechanism is coupled to a hook end of the hook assembly for movement relative to a hook body and suggesting that the detent is displaced relative to the hook body to allow a balking structure coupled to the handle to be inserted into a void and allow movement of the latch mechanism to the locked position when the hook is engaged with the clevis to move the hook end to a first distance.
Figure 5:
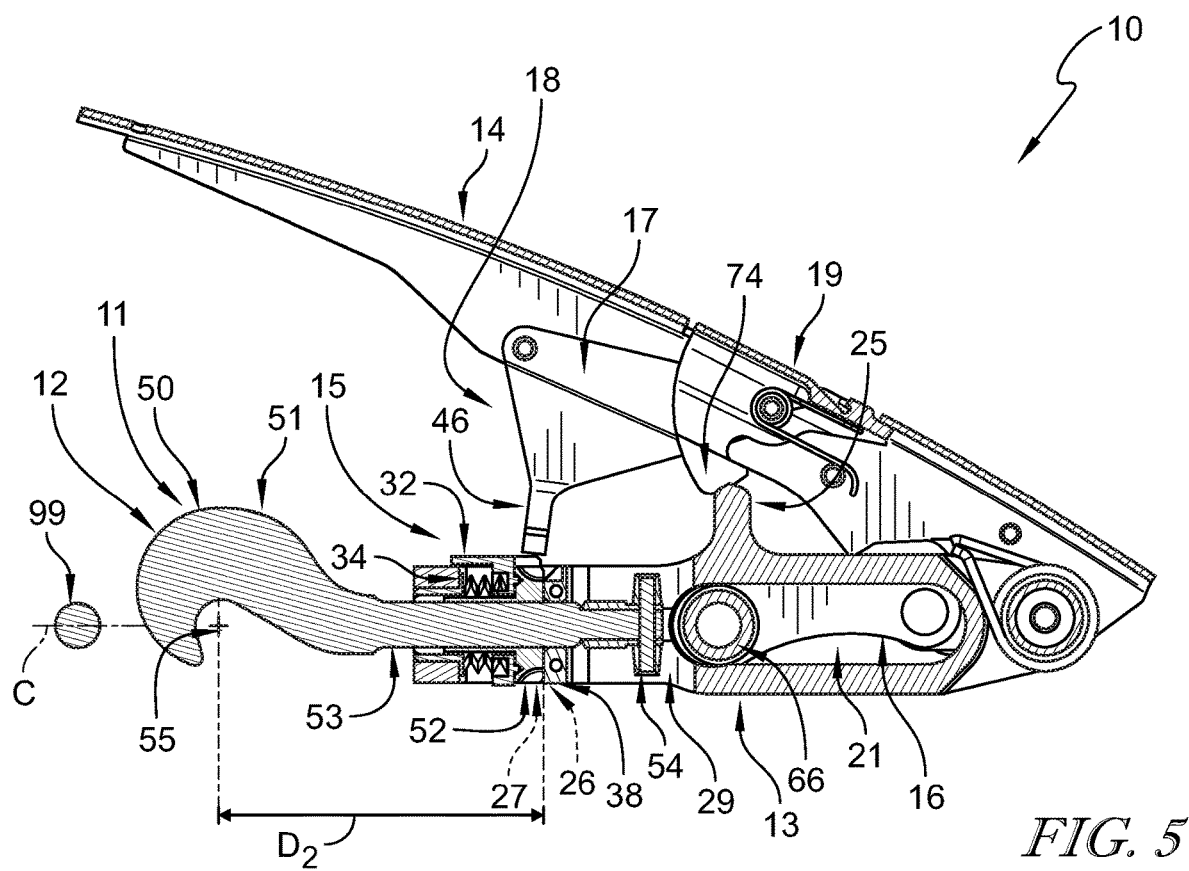
FIG. 5 is a sectional view taken along line 5-5 in FIG. 2 showing the clevis spaced apart from the hook and suggesting that a spring moves the hook end to a second distance to position the detent in the void for engage with the balking structure to block movement of the latch mechanism to the locked position.

When clevis 99 is properly received in engagement area 55 of hook 12, movement of latch mechanism 10 toward the locked position moves hook end 11 and detent plate 32 along axis C relative to hook body 13 against the bias of spring 34 as suggested in FIG. 4. In the illustrative embodiment, adjuster 52 engages with detent plate 32 to move detent plate 32 with head 50 of hook end 11. Detent plate 32 is moved to the access position as latch mechanism 10 moves toward the locked position to define a void 27 in pocket 26 between detent plate 32 and lock plate 38. Contact portion 46 of balking structure 17 extends into void 27 to allow latch mechanism 10 to move to the locked position shown in FIG. 4. Engagement area 55 of hook end 11 is positioned at a first distance $D_1$ away from lock plate 38 when detent plate 32 is in the access position. When clevis 99 is misaligned from engagement area 55 (i.e., spaced apart from hook 12), spring 34 biases detent plate 32 toward the blocking position to fill void 27 as suggested in FIG. 5. Contact portion 46 of balking structure 17 engages with detent plate 32 to block further movement of latch mechanism 10 toward the locked position. Engagement area 55 of hook end 11 is positioned at a second distance $D_2$ away from lock plate 38 when detent plate 32 is in the blocking position, and second distance $D_2$ is shorter than first distance $D_1$.

Handle 14 is configured to move from a fully opened position, shown in FIG. 6, to the closed position, shown in FIG. 7, when latch mechanism 10 is properly aligned for engagement with clevis 99. Handle 14 can only move from the opened position to the free position when latch mechanism 10 is misaligned with clevis 99 due to engagement of balking structure 17 with detent 15 as suggested in FIGS. 8 and 9. Handle 14 provides a signal to a user that latch mechanism 10 is in the unlocked position (i.e., not the closed position) when handle 14 is in the free or opened positions, including positions therebetween. For example, handle 14 can be substantially aligned with a surface of the structure on which latch mechanism 10 is mounted when handle 14 is in the closed position, and handle 14 can be substantially misaligned with (e.g., protruding from) the surface of the structure when handle 14 is in the free position, opened position, or another position between the free and opened positions. In some embodiments, an indicia is formed on handle 14, such as a colored paint or film, to provide additional visibility to a user of handle 14 in the free and opened positions.

Various embodiments of balking structures are contemplated by the present disclosure. In one embodiment, balking structure 17 is formed form a stamped, bent, or forged sheet of metal as suggested in FIG. 10. Balking structure 17 includes connector walls 42, 44 and contact portion 46. Connector walls 42, 44 are coupled to handle 14 to hold balking structure 17 on handle 14. Contact portion 46 is formed to define fingers 41 and bridge 43. Fingers 41 are arranged for engagement with detent plate 32 when detent 15 is in the blocking position. Bridge 43 is shaped and arranged to provide clearance (e.g., around shaft 53 of hook end 11) for contact portion 46 to enter void 27 when detent 15 is in the access position. In another embodiment, a balking structure 117, similar to balking structure 17, includes a lateral support member 145, such as a fastener, to reinforce the rigidity of balking structure 117 as shown in FIG. 11.

In another embodiment, a balking structure 217 is formed as a solid molded, machined, or forged component as suggested in FIG. 12. Balking structure 217 includes a base 240 and a contact portion 246. Base 240 is coupled to handle 14 to hold balking structure 217 on handle 14. Contact portion 246 is formed to define fingers 241 and a bridge 243. Fingers 241 are arranged for engagement with detent plate 32 when detent 15 is in the blocking position. Bridge 243 is shaped and arranged to provide clearance (e.g., around shaft 53 of hook end 11) for contact portion 246 to enter void 27 when detent 15 is in the access position.

In another embodiment, a balking structure 317 is formed as a unitary component or assembly of components as suggested in FIG. 13. Balking structure 317 includes a pair of spaced apart connector walls 342, 344 and a contact portion 346. Connector walls 342, 344 are coupled to handle 14 to hold balking structure 317 on handle 14. Contact portion 346 is formed to define fingers 341 and a relief 343 between fingers 341. Fingers 341 are arranged for engagement with detent plate 32 when detent 15 is in the blocking position. Relief 343 is shaped and arranged to provide clearance (e.g., around shaft 53 of hook end 11) for contact portion 346 to enter void 27 when detent 15 is in the access position. A lateral support member 345, such as a fastener, extends between connector walls 342, 344. In some embodiments, balking structure 317 is formed form a stamped, bent, or forged sheet of metal where connector walls 342, 344, contact portion 346, and lateral support member 345 are unitary. In some embodiments, connector walls 342, 344, contact portion 346, and lateral support member 345 are formed separately and assembled together.

In another embodiment, a balking structure 417 is formed as a solid molded, machined, or forged component as suggested in FIG. 14. Balking structure 417 includes a base 440 and a contact portion 446. Base 440 is coupled to handle 14 to hold balking structure 417 on handle 14. Contact portion 446 is formed to define fingers 441 and a relief 443. Fingers 441 are arranged for engagement with detent plate 32 when detent 15 is in the blocking position. Relief 443 is shaped and arranged to provide clearance (e.g., around shaft 53 of hook end 11) for contact portion 346 to enter void 27 when detent 15 is in the access position.

In illustrative embodiments, latch mechanisms in accordance with the present disclosure allow an operator to be able to easily know if a latch has grabbed onto its clevis when the latch is closed to ensure that access panels, such as an engine cowling on an aircraft, are properly closed and secured. If the clevis is not present, then the latch mechanism remains in an open (unlocked) position. An orientation of the clevis may be misaligned with the hook until the two are engaged with each other. With an adjustable hook latch, the hook can rotate about its adjustment axis enough to align with the clevis and properly interface with it. If the clevis is not present, then a clevis-sensing feature of the hook latch blocks the latch from closing fully and the latch remains in the open position. The clevis-sensing feature blocks the latch from closing even when the hook rotates about its adjustment axis.

In illustrative embodiments, the clevis-sensing mechanisms of the present disclosure provide a simple, clean way to detect the clevis while minimizing parts and avoiding engagement between the clevis-sensing mechanisms directly with the clevis.

In illustrative embodiments, the adjustable hook latch includes a hook with a threaded shaft for adjustment, a nut that turns on the threaded axis of the hook for adjustment, a detent plate that engages a face of the nut, and a spring to push the detent plate and the nut together. The detent plate has two raised features (studs) that interface with similarly shaped depressions on the face of the nut, and block the nut from turning when the hook latch is closed and engaged on the clevis. The hook, nut, and detent plate fit inside a hook body. A spring is positioned between the detent plate and the hook body to push the detent plate against the nut. When the hook latch engages with the clevis in the closed position, the hook pulls the nut and detent plate and compresses the spring, leaving a void next to the adjustment nut. When the hook latch is open, the spring pushes the detent plate, nut, and hook into the void.

In illustrative embodiments, the adjustable hook latch also includes a handle that is attached to the back of the hook body, and operates a linkage system that moves the hook and provides the primary latching feature. A balking feature is attached to the handle and fits into the void next to the nut when the latch is closed and the hook is engaged on the clevis. During the closing operation, if the hook is not engaged on the clevis, then the balking feature on the handle collides with a feature on the detent plate that covers part of the adjustment nut. The feature of the detent plate that covers part of the nut prevents the balking feature on the handle from accidentally turning the nut.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation to encompass all such modifications and equivalent structures and functions.

The invention claimed is:

1. A latch mechanism comprising:
   a hook including a hook body and a hook end coupled to the hook body, the hook body formed to define a pocket, the hook end including a head and a single shaft extending from the head, the shaft extending through a portion of the hook body into the pocket;
   a handle coupled to the hook body for rotation relative to the hook body between a closed position where the handle extends along the hook and an opened position where the handle is spaced apart from the hook end;
   a linkage coupled between the handle and the hook, the linkage configured to move the hook relative to a clevis with rotation of the handle; and
   a clevis-sensing mechanism including a detent extending into in the pocket and coupled to the shaft of the hook end and a balking structure coupled to the handle for movement with the handle, the detent movable relative to the hook body within the pocket between a blocking position to engage with the balking structure and block rotation of the handle to the closed position and an access position to define a void in the pocket between the detent and the hook body for at least a portion of the balking structure to enter the void and allow the handle to move to the closed position,
   wherein the clevis sensing-mechanism is configured to block the handle from moving to the closed position in response to the hook end being spaced apart from the clevis.

2. The latch mechanism of claim 1, wherein the hook end is movable relative to the hook body, wherein the detent moves with the hook end, wherein the detent is biased toward the blocking position, and wherein the detent moves toward the access position in response to engagement of the hook end with the clevis and rotation of the handle toward the closed position.

3. The latch mechanism of claim 2, further comprising a biasing member positioned between the hook body and the detent, wherein the biasing member is configured to bias the detent toward the blocking position.

4. The latch mechanism of claim 2, wherein the hook end extends through a portion of the hook body and into the pocket to couple with the detent.

5. The latch mechanism of claim 4, further comprising an adjuster arranged in the pocket and coupled to the hook end for movement with the hook end relative to the hook body, wherein the adjuster is configured to engage with the detent to move the detent toward the access position in response to engagement of the hook end with the clevis and rotation of the handle toward the closed position.

6. The latch mechanism of claim 1, wherein a contact portion of the balking structure is configured to engage with the detent in the blocking position and to extend into the void with the detent in the access position.

7. The latch mechanism of claim 1, wherein the handle is movable to a free position spaced apart from the closed position, and wherein the baking structure is configured to engage with the detent in the blocking position to block the handle from moving from the free position to the closed position in response to the hook end being spaced apart from the clevis.

8. The latch mechanism of claim 1, wherein the hook end is formed to define an engagement area configured to engage with the clevis, wherein the engagement area is spaced a first distance from the hook body with the detent in the access position, wherein the engagement area is spaced a second distance from the hook body with the detent in the blocking position, and wherein the second distance is shorter than the first distance.

9. A latch mechanism for retaining a first component against a second component, the latch mechanism comprising:
 a hook including a hook body and a hook end coupled to the hook body, the hook body formed to define a pocket, the hook end including a head and a single shaft extending from the head, the shaft extending through the hook body into the pocket;
 a handle coupled to the hook body for rotation relative to the hook body between a closed position where the handle extends along the hook and an opened position where the handle is spaced apart from the hook end;
 a linkage coupled between the handle and the hook and arranged for mounting the latch mechanism on the first component, the linkage configured to move the hook relative to a clevis of the second component with rotation of the handle; and
 a clevis-sensing mechanism including a detent extending into the pocket and coupled to the shaft of the hook end and a balking structure coupled to the handle for movement with the handle, the detent movable relative to the hook body within the pocket between a blocking position to engage with the balking structure and block rotation of the handle to the closed position and an access position to define a void in the pocket between the detent and the hook body for at least a portion of the balking structure to enter the void and allow the handle to move to the closed position, wherein the clevis sensing-mechanism is configured to block the handle from moving to the closed position in response to the hook end being spaced apart from the clevis.

10. The latch mechanism of claim 9, wherein the hook end is movable relative to the hook body, wherein the detent moves with the hook end, wherein the detent is biased toward the blocking position, and wherein the detent moves toward the access position in response to engagement of the hook end with the clevis and rotation of the handle toward the closed position.

11. The latch mechanism of claim 10, further comprising a biasing member positioned between the hook body and the detent, wherein the biasing member is configured to bias the detent toward the blocking position.

12. The latch mechanism of claim 10, wherein the hook end extends through a portion of the hook body and into the pocket to couple with the detent.

13. The latch mechanism of claim 12, further comprising an adjuster arranged in the pocket and coupled to the hook end for movement with the hook end relative to the hook body, wherein the adjuster is configured to engage with the detent to move the detent toward the access position in response to engagement of the hook end with the clevis and rotation of the handle toward the closed position.

14. The latch mechanism of claim 9, wherein a contact portion of the balking structure is configured to engage with the detent in the blocking position and to extend into the void with the detent in the access position.

15. The latch mechanism of claim 9, wherein the handle is movable to a free position spaced apart from the closed position, and wherein the baking structure is configured to engage with the detent in the blocking position to block the handle from moving from the free position to the closed position in response to the hook end being spaced apart from the clevis.

16. The latch mechanism of claim 15, wherein the handle is substantially aligned with a surface of the first component in the closed position, and wherein the handle is substantially misaligned with the surface of the first component in the free position to provide a visual indication that the handle is not in the closed position.

17. The latch mechanism of claim 9, wherein the hook end is formed to define an engagement area configured to engage with the clevis, wherein the engagement area is spaced a first distance from the hook body with the detent in the access position, wherein the engagement area is spaced a second distance from the hook body with the detent in the blocking position, and wherein the second distance is shorter than the first distance.

* * * * *